United States Patent
Wu et al.

(10) Patent No.: US 10,291,964 B2
(45) Date of Patent: May 14, 2019

(54) MULTIMEDIA BROADCAST SYSTEM

(71) Applicants: AT&T Mobility II LLC, Atlanta, GA (US); AT&T INTELLECTUAL PROPERTY I, L.P., Atlanta, GA (US)

(72) Inventors: Xidong Wu, San Ramon, CA (US); Mario Kosseifi, Roswell, GA (US); Zhengye Liu, Pleasanton, CA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 15/370,845

(22) Filed: Dec. 6, 2016

(65) Prior Publication Data

US 2018/0160192 A1   Jun. 7, 2018

(51) Int. Cl.
*H04N 21/485* (2011.01)
*H04N 21/43* (2011.01)
(Continued)

(52) U.S. Cl.
CPC ..... *H04N 21/4856* (2013.01); *H04N 21/4302* (2013.01); *H04N 21/439* (2013.01); *H04N 21/4398* (2013.01); *H04N 21/4402* (2013.01); *H04N 21/4524* (2013.01); *H04N 21/4622* (2013.01)

(58) Field of Classification Search
CPC ........... H04N 21/6338; H04N 21/4302; H04N 21/439; H04N 21/44; H04N 21/4516; H04N 21/4621; H04N 21/485; H04N 21/4856
See application file for complete search history.

(56) References Cited

U.S. PATENT DOCUMENTS 6,209,028 B1 * 3/2001 Walker ................. H04N 21/435
                                                              348/E7.071
7,518,503 B2   4/2009 Peele
(Continued)

FOREIGN PATENT DOCUMENTS

FR   2981782 B1   4/2013
GB   2410160 A    7/2005
(Continued)

OTHER PUBLICATIONS

"Blipcast," blipcast, blipcast.co, https://web.archive.org/web/20160818063306/http://www.blipcast.co/, Aug. 18, 2016, Last Accessed May 25, 2017.
(Continued)

*Primary Examiner* — Randy A Flynn
(74) *Attorney, Agent, or Firm* — Amin, Turocy & Watson, LLP

(57) ABSTRACT

Management of multimedia communications is provided. A method can include identifying, by a device comprising a processor, an available media communication, wherein the available media communication comprises an audio stream and a video stream that is distinct from the audio stream, receiving, by the device, the audio stream of the available media communication, resulting in a received media stream, altering, by the device, the received media stream, resulting in an altered media stream, and facilitating, by the device, a rendering of the altered media stream.

20 Claims, 9 Drawing Sheets

(51) Int. Cl.
*H04N 21/439* (2011.01)
*H04N 21/4402* (2011.01)
*H04N 21/45* (2011.01)
*H04N 21/462* (2011.01)

(56) References Cited

U.S. PATENT DOCUMENTS

| | | | |
|---|---|---|---|
| 7,817,017 B1 | 10/2010 | Benun et al. | |
| 8,495,236 B1 | 7/2013 | Glasser | |
| 8,505,054 B1* | 8/2013 | Kirley | H04N 21/436 725/74 |
| 8,549,569 B2* | 10/2013 | Casagrande | H04N 21/4307 348/500 |
| 8,634,030 B2 | 1/2014 | Hale et al. | |
| 8,719,874 B2 | 5/2014 | Vance | |
| 9,088,816 B2 | 7/2015 | Ginn et al. | |
| 9,104,661 B1* | 8/2015 | Evans | H04N 21/2343 |
| 9,338,391 B1 | 5/2016 | Greene et al. | |
| 9,357,215 B2 | 5/2016 | Boden et al. | |
| 9,398,322 B2 | 7/2016 | Hawkins et al. | |
| 9,418,296 B1* | 8/2016 | Kansara | H04N 21/6547 |
| 2003/0025832 A1* | 2/2003 | Swart | H04N 21/2543 348/461 |
| 2003/0046075 A1* | 3/2003 | Stone | H04N 21/435 704/257 |
| 2003/0084442 A1* | 5/2003 | Kellner | H04N 21/4532 725/38 |
| 2004/0220862 A1 | 11/2004 | Jackson | |
| 2004/0250272 A1* | 12/2004 | Durden | H04N 21/4532 725/25 |
| 2007/0204321 A1* | 8/2007 | Shen | H04N 21/23109 725/135 |
| 2008/0077954 A1* | 3/2008 | Cohen | H04N 21/234318 725/32 |
| 2010/0027765 A1* | 2/2010 | Schultz | H04M 3/42391 379/52 |
| 2010/0289954 A1* | 11/2010 | Sullivan | H04N 21/4307 348/515 |
| 2011/0296484 A1 | 12/2011 | Harres et al. | |
| 2012/0105719 A1* | 5/2012 | Fratti | H04N 21/8106 348/462 |
| 2012/0200774 A1 | 8/2012 | Ehlers | |
| 2012/0260295 A1 | 10/2012 | Rondeau | |
| 2013/0211567 A1 | 8/2013 | Oganesyan et al. | |
| 2014/0002738 A1 | 1/2014 | Nunes | |
| 2014/0137159 A1 | 5/2014 | Ryan | |
| 2014/0341408 A1 | 11/2014 | Varghese et al. | |
| 2014/0363143 A1* | 12/2014 | Dharssi | H04N 21/23412 386/282 |
| 2015/0121435 A1 | 4/2015 | Wang et al. | |
| 2015/0208161 A1 | 7/2015 | Lesaffre | |
| 2015/0237237 A1* | 8/2015 | Meek | H04N 5/04 348/518 |
| 2016/0241898 A1* | 8/2016 | Korz | H04N 21/658 |
| 2016/0249096 A1 | 8/2016 | Ortiz et al. | |

FOREIGN PATENT DOCUMENTS

| | | |
|---|---|---|
| GB | 2460219 B | 11/2009 |
| GB | 2527182 A | 12/2015 |
| JP | 2003087704 A | 3/2003 |
| WO | 2012114169 A1 | 8/2012 |

OTHER PUBLICATIONS

"Lime.On-Air," LimeOnAir, http://www.limeonair.com/, Sep. 2016, Last Accessed May 25, 2017.

"Home," Audio Everywhere, audioeverywhere.com, https://web.archive.org/web/20160315102653/http://www.audioeverywhere.com/, Mar. 15, 2016, Last Accessed May 25, 2017.

"All-new Roku® Streaming Stick®," Roku®, roku.com, https://web.archive.org/web/20160505154444/https://www.roku.com/products/streaming-stick, May 5, 2016, Last Accessed May 25, 2017.

"Home," Tunity, tunity.com, https://web.archive.org/web/20160504225551/http://www.tunity.com/, May 4, 2016, Last Accessed May 25, 2017.

* cited by examiner

MULTIMEDIA BROADCAST SYSTEM

TECHNICAL FIELD

The present disclosure relates to wireless networks, and in particular, to techniques for managing and processing multimedia broadcasts in a wireless communication network.

BACKGROUND

Advancements in areas such as wireless networks and content delivery systems have led to an ever-growing amount of media content available to media consumers as well as the flexibility with which such content can be consumed. For instance, mobile broadcast systems can enable a user of a mobile device to receive multimedia content at any location with wireless connectivity, such as the user's home or office, a public venue such as a bar or gym, and so on. As the use of mobile content delivery systems continues to grow, it is desirable to implement techniques that add value to such systems and improve overall user satisfaction.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In an aspect, a method as described herein can include identifying, by a device comprising a processor, an available media communication. The available media communication can include an audio stream and a video stream that is distinct from the audio stream. The method can further include receiving, by the device, the audio stream of the available media communication, resulting in a received media stream. The method can also include altering, by the device, the received media stream, resulting in an altered media stream. The method can additionally include facilitating, by the device, a rendering of the altered media stream.

In another aspect, a system as described herein can include a processor and a memory that stores executable instructions that, when executed by the processor, facilitate performance of operations. The operations can include identifying an available media communication including an audio stream and a video stream that is distinct from the audio stream; receiving the audio stream of the available media communication, resulting in a received media stream; altering the received media stream, resulting in an altered media stream; and playing the altered media stream.

In a further aspect, a machine-readable storage medium as described herein can include executable instructions that, when executed by a processor, facilitate performance of operations. The operations can include identifying an available media communication, where the available media communication comprises an audio stream and a video stream that is distinct from the audio stream; receiving the audio stream of the available media communication, resulting in a received media stream; altering the received media stream, resulting in an altered media stream; and facilitating playing of the altered media stream.

Figure 1:
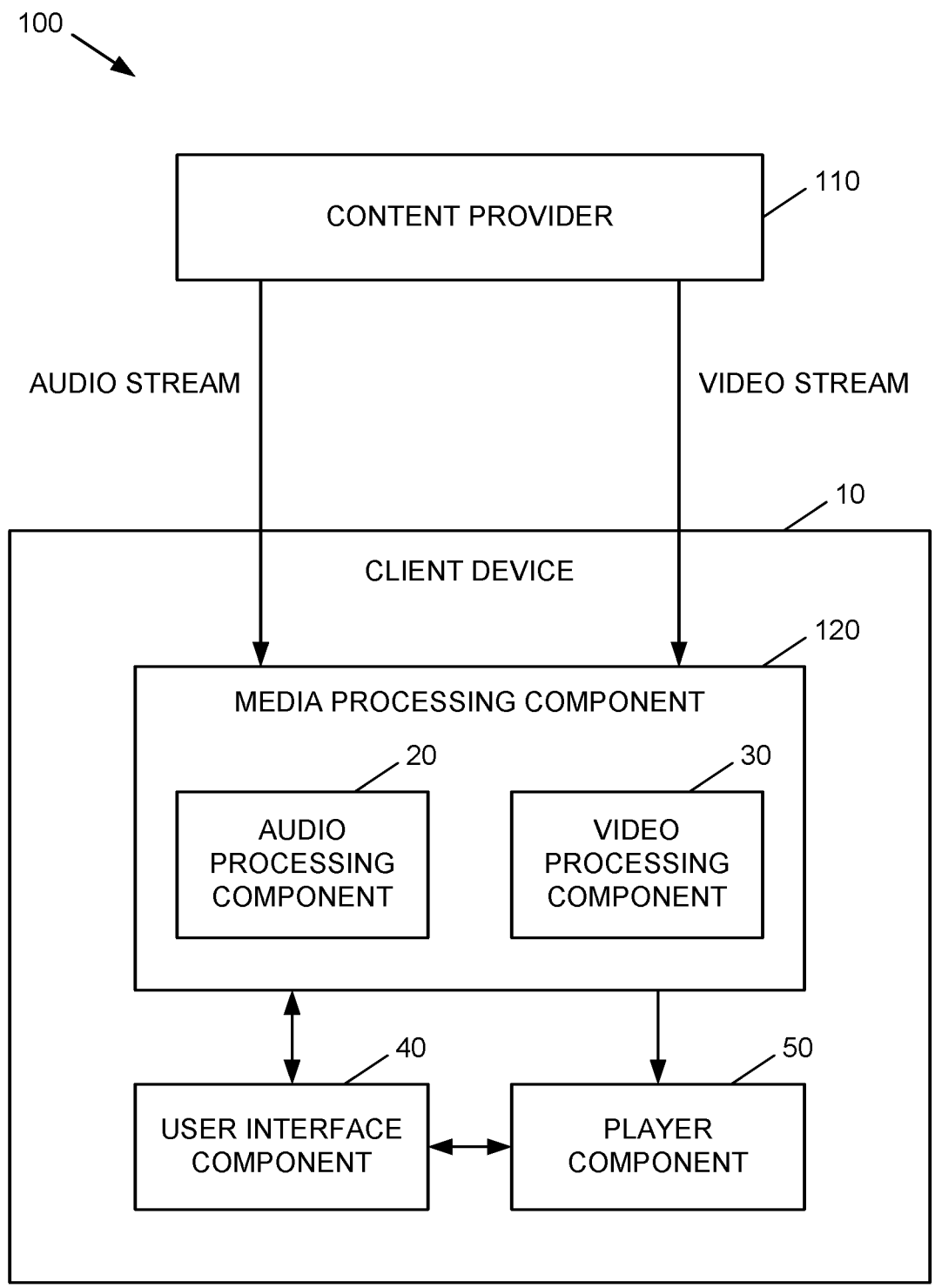
FIG. 1 is a block diagram of a system for processing and rendering received media streams.

Referring first to FIG. 1, a system 100 for processing and rendering media streams is illustrated. The system 100 includes a client device 10 that is configured to receive media content from a content provider 110. The content provider 110 can be any device, network, or other entity configured to convey media information (e.g., audio, video, images, etc.) to devices including the client device 10. By way of example, the content provider 110 could be a cellular service provider, a television provider, a music and/or radio provider, a media server, or the like. Here, the content provider 110 communicates information to the client device 10 via a wireless communication link (e.g., Wi-Fi, Bluetooth, cellular, etc.). In some embodiments, the content provider 110 can communicate wirelessly to the client device 10 via a wireless media broadcast protocol such as the Mobile Broadband Multicast Service (MBMS), Evolved MBMS (eMBMS), etc. Additionally or alternatively, a wired communication link could also be used. In general, the content provider 110 and client device 10 can communicate using any suitable communication protocol or combination of protocols either presently existing or developed in the future. Further, the content provider 110 can communicate with the client device 10 either directly or indirectly via one or more intervening networks or internetworks, such as the Internet. In some embodiments, the content provider 110 can be associated with a local network in which the client device 10 is located.

As shown in FIG. 1, the content provider 110 is configured to provide an available media communication that includes an audio stream and a video stream. While only one audio stream and one video stream are illustrated for simplicity, the content provider 110 can be configured to provide any number of audio streams and/or video streams, or no video streams and/or audio streams, to the client device 10. As further shown in FIG. 1, the media streams communicated by the content provider 110 are received at the client device 10 via a media processing component 120. The media processing component 120, in turn, includes an audio processing component 20 and a video processing component 30 for processing the audio and video components of the received stream(s), respectively. The processing performed by the media processing component 120 results in a media stream that is playable by a player component 50.

Here, the client device 10 is a computing device, or combination of devices, that is configured to obtain media from the content provider 110 and facilitate playing the received media to a user of the device. The client device 10 may be, or include the functionality of, a smartphone, a computer, a smart television, a set-top box (STB), a media receiver, and/or any other device configured to process incoming media via the media processing component 120 and/or play the resulting processed media via the player component 50.

In one aspect, the media processing component 120 and the player component 50 can be associated with different physical devices. For instance, the media processing component 120 can be associated with a STB or a similar device, and the player component 50 can be associated with a separate media playback device (e.g., a television) that is communicatively coupled to the STB via a wired or wireless network connection, an audio/visual connection (e.g., coaxial, High-Definition Multimedia Interface (HDMI), Sony/Philips Digital Interface Format (S/PDIF), etc.), and/or any other suitable connection type(s).

As further shown in FIG. 1, the audio stream associated with an available media broadcast is transmitted by the content provider 110 separately from the video stream. The audio stream of an available media broadcast can be transmitted using the same communication protocol(s) as the video stream or a different protocol. In one aspect, a video stream corresponding to a media communication can be transmitted by the content provider 110 via eMBMS and/or another suitable transmission protocol over a Wi-Fi, Bluetooth, or other suitable communication link, while the audio stream of the media communication is provided as a voice call or a Voice over Internet Protocol (VoIP) call to the client device 10 and played at the client device 10 via the device's existing voice call functionality. Irrespective of the communication protocols used to transmit the audio and video streams of a media communication, the content provider 110 can transmit the audio and video streams using the same communication resources (e.g., communication channel, frequency band or range, etc.) or different resources. By way of example, an audio stream can be transmitted via a first communication channel and a video stream can be transmitted via a second communication channel that is different than the first communication channel.

By splitting the media content between separate audio and video streams, the content provider 110 is able to utilize network bandwidth and/or other resources between the content provider 110 and the client device 10 with improved efficiency. As an example, if the client device 10 desires only one of the video stream or the audio stream, the client device 10 can receive only the desired stream and not expend additional bandwidth on additional, undesired streams. Additionally, providing the audio and video components of a media communication separately facilitates separate processing of the corresponding streams via the audio processing component 20 and the video processing component 30, respectively. Various processing tasks that can be performed by the processing components 20, 30 are described in further detail below. Upon processing of the audio stream and/or video stream received from the content provider 110, the media processing component 120 can merge the audio and video streams for playing by the player component 50 and/or provide separate streams to be played by the same or different player components 50.

The client device 10 further includes a user interface (UI) component 40, which provides means for a user of the client device 10 to direct the processing and/or rendering of media streams received from sources such as the content provider 110. In one example, the UI component 40 can be implemented as a visual UI within a media client application associated with the client device 10, a configuration application associated with the client device 10, and/or another suitable application. Additionally or alternatively, the UI component can include one or more hardware devices that provide user input to the client device 10. These devices could include, but are not limited to, a touchscreen, keyboard, mouse, remote control, game controller, or the like.

In one aspect, the audio processing component 20, the video processing component 30, the UI component 40, and the player component 50 are integrated into a common application at the client device 10. In this way, a user of the client device 10 can efficiently obtain, process, and play media streams from the content provider 110 all from a single application. Alternatively, the functionality of components 20, 30, 40, 50 can be divided among multiple different applications. For instance, the audio processing component 20 can be implemented via a first application module, the video processing component 30 can be implemented via a second application module, and the UI component 40 and player component 50 can be implemented via a third application module. In an embodiment that utilizes multiple modules in this manner, the respective modules can be configured to share data with each other as needed to provide rendered media for playing at the player component 50. Additionally, modules associated with the audio processing component 20 and/or video processing component 30 can be configured to operate transparently to an end user, resulting in a similar user experience to an embodiment where each of the components 20, 30, 40, 50 are implemented in the same application.

Figure 2:
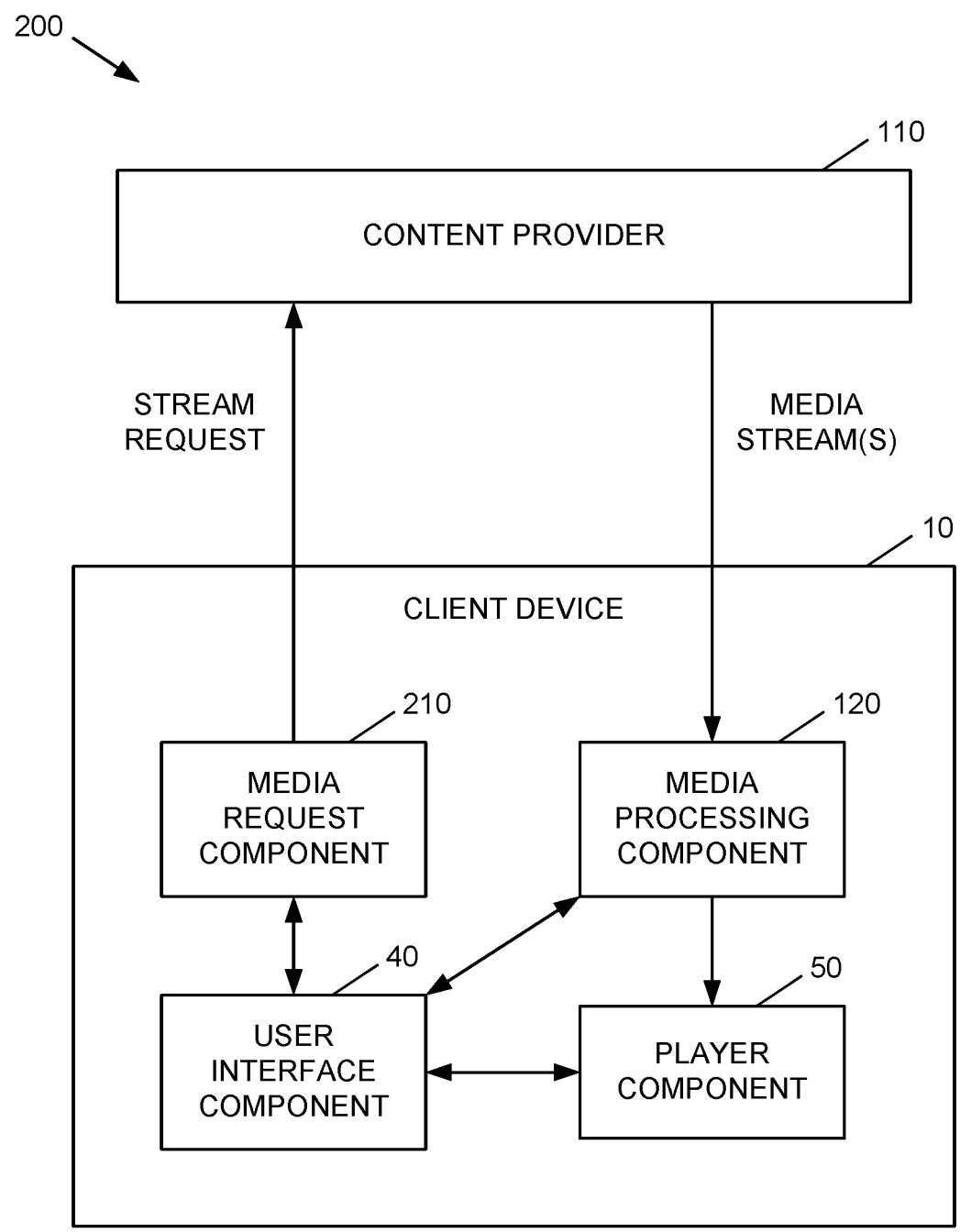
FIG. 2 is a block diagram of a system for managing media streams received from a content provider.

Turning next to FIG. 2, a system 200 for managing media streams received from a content provider is illustrated. The system includes a content provider 110 and a client device 10 having a media processing component 120, a UI component 40, and a player component 50 as described above with respect to FIG. 1. In addition, the client device 10 includes a media request component 210 that facilitates communication of requested media streams from the content provider 110 to the client device 10.

As shown in system 200, the media request component 210 can be configured to submit a media request to the content provider 110 that specifies one or more desired audio streams and/or video streams, e.g., an audio stream and/or video stream associated with an available media communication. In response to the request, the content provider 110 can communicate the requested stream(s) to the client device 10 for processing. In one example, the media request component 210 can direct a request to the content provider 110 using an identifier for the content provider 110, such as an Internet Protocol (IP) address, a domain name, a local network address, etc.

In one example, the media request component 210 can be controlled by the UI component 40, e.g., via a menu or other interface that facilitates selection of desired media streams. In another example, the media request component 210 shown in FIG. 2 may not be present, or may not communicate directly with the content provider 110. For instance, the content provider 110 may broadcast multiple media streams substantially simultaneously, and the media request component 210, with or without direction from the UI component 40, can facilitate reception of a desired stream from among the broadcasted streams without submitting a request for the desired stream to the content provider 110.

In a further example, the media request component can request and/or otherwise control a quality (e.g., bitrate, resolution, sample rate, etc.) of media streams received from the content provider 110. The quality of a media stream received by the client device 10 can be based on a user selection via the UI component 40, available network bandwidth, available computing resources (e.g., memory, storage space, etc.) at the client device 10, and/or other factors. Additionally or alternatively, the quality associated with a communication from the content provider 110 to the client device 10 can be based at least in part on the terms of a media subscription between the content provider 110 and a user of the client device 10. For instance, a given media broadcast can have both standard definition and high definition streams, and access to the high definition streams can be limited to users having a subscription with the content provider 110 that permits access to said streams. Other techniques for controlling the quality of a received media communication are also possible.

The media request component 210 can submit a stream request associated with a particular quality, or a desired quality can be obtained from the content provider 110 without a direct request for the desired quality. For instance, the content provider 110 can broadcast a given media stream in multiple qualities, and the media request component 210 can select for reception the media stream of the desired quality. Alternatively, the content provider 110 can select the quality to be utilized for the media stream directed to the client device 10 based on factors such as current network conditions, signal quality metrics associated with the client device 10, data relating to a subscription associated with the client device 10, or the like.

In general, the media processing component 120 can be used to perform one or more operations on media streams, such as media streams received from the content provider 110, before playing the streams via the player component 50. Stated another way, the media processing component 120, via the audio processing component 20 and/or the video processing component 30, can be configured to alter incoming audio streams and/or video streams, respectively, resulting in one or more altered or processed media streams. These altered media streams, in turn, are played by the player component 50.

With reference below to FIGS. 3-6, illustrated are specific, non-limiting examples of various processing sub-components that can be employed by the audio processing component 20 and the video processing component 30. The audio processing component 20 and the video processing component 30, via the respective illustrated sub-components, can perform operations to alter incoming media streams in order to generate altered media streams as described below. It should be appreciated, however, that the below description is not intended to be an exhausting listing of processing operations that could be performed, and other operations are possible.

Figure 3:
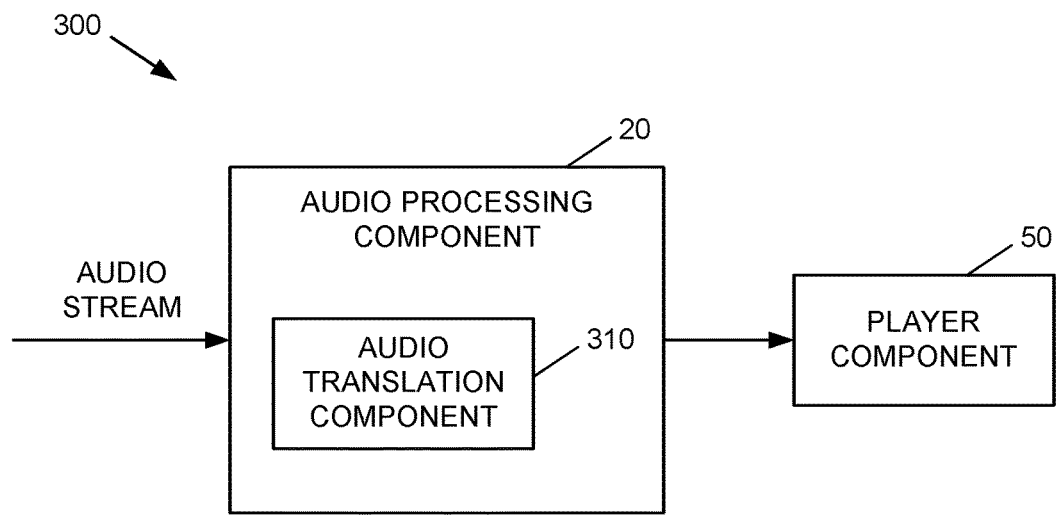
FIGS. 3-5 are functional block diagrams of respective systems for audio/visual processing that can be implemented by the media client of FIG. 1.

Turning to FIG. 3, a system 300 is illustrated that includes an audio processing component 20 having an audio translation component 310. The audio processing component 20 receives an audio stream (e.g., from the content provider 110 and/or another source) in a first language and translates, via the audio translation component 310, the audio stream to a second language that is different from the first language. The translated audio stream is then sent to the player component 50 for rendering and playing, either by itself or with an accompanying video stream.

In an aspect, the audio translation component 310 is configured to identify spoken words or phrases in an audio stream in a given (source) language (e.g., English), perform an audio translation of those words or phrases to a different (target) language (e.g., Spanish, French, Japanese, etc.), and subsequently insert the translated audio in the target language into the audio stream. Insertion of the translated audio can be performed by replacing the original audio with the translated audio, dubbing the translated audio over the original audio, and/or by any other suitable means. In another aspect, the audio translation component 310 can be configured to identify spoken words in multiple source languages within the same audio stream. In this case, the audio translation component 310 can identify a specific source language for respective words or phrases of the audio stream and apply an appropriate translation from the identified source language to the specified target language.

Figure 4:
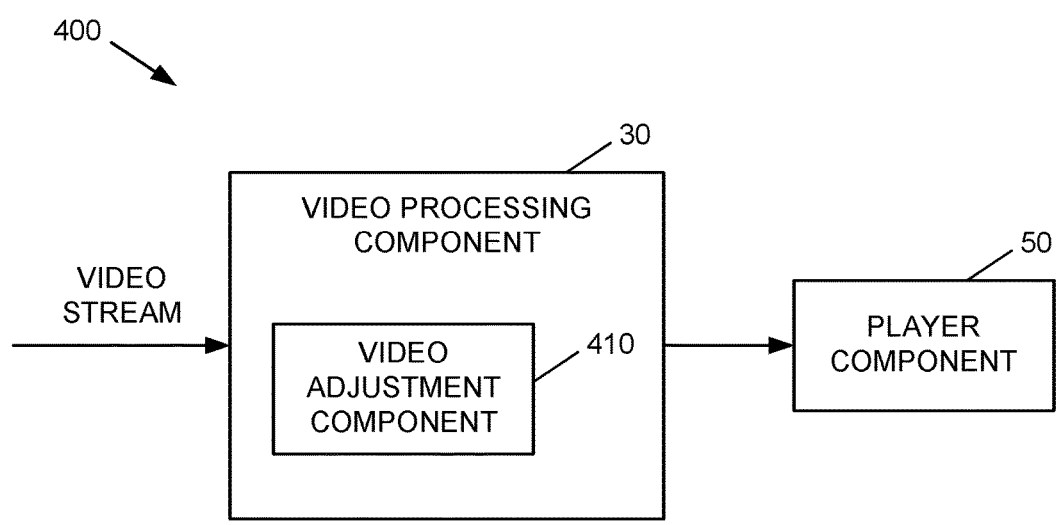

Referring next to FIG. 4, a system 400 is illustrated that includes a video processing component 30 having a video adjustment component 410. The video processing component 30 receives a video stream (e.g., from the content provider 110 and/or another source), adjusts at least one visual property of the video (e.g., gamma or contrast settings, color settings, etc.), and provides the adjusted video stream to the player component 50 for rendering and playing independently or with an accompanying audio stream.

In an aspect, the video adjustment component 410 is configured to identify a first (source) color profile associated with an incoming video stream and convert the video stream to a second (target) color profile that differs from the source color profile. By way of example, a video stream corresponding to a colorized movie and/or other full-color presentation can be converted to black-and-white by the video adjustment component 410. As another example, the video adjustment component 410 can convert an incoming video stream to a colorblind profile that increases visual distinction between particular hues (e.g., red and green, blue and yellow, etc.). Other transformations and/or adjustments could also be performed.

Figure 5:
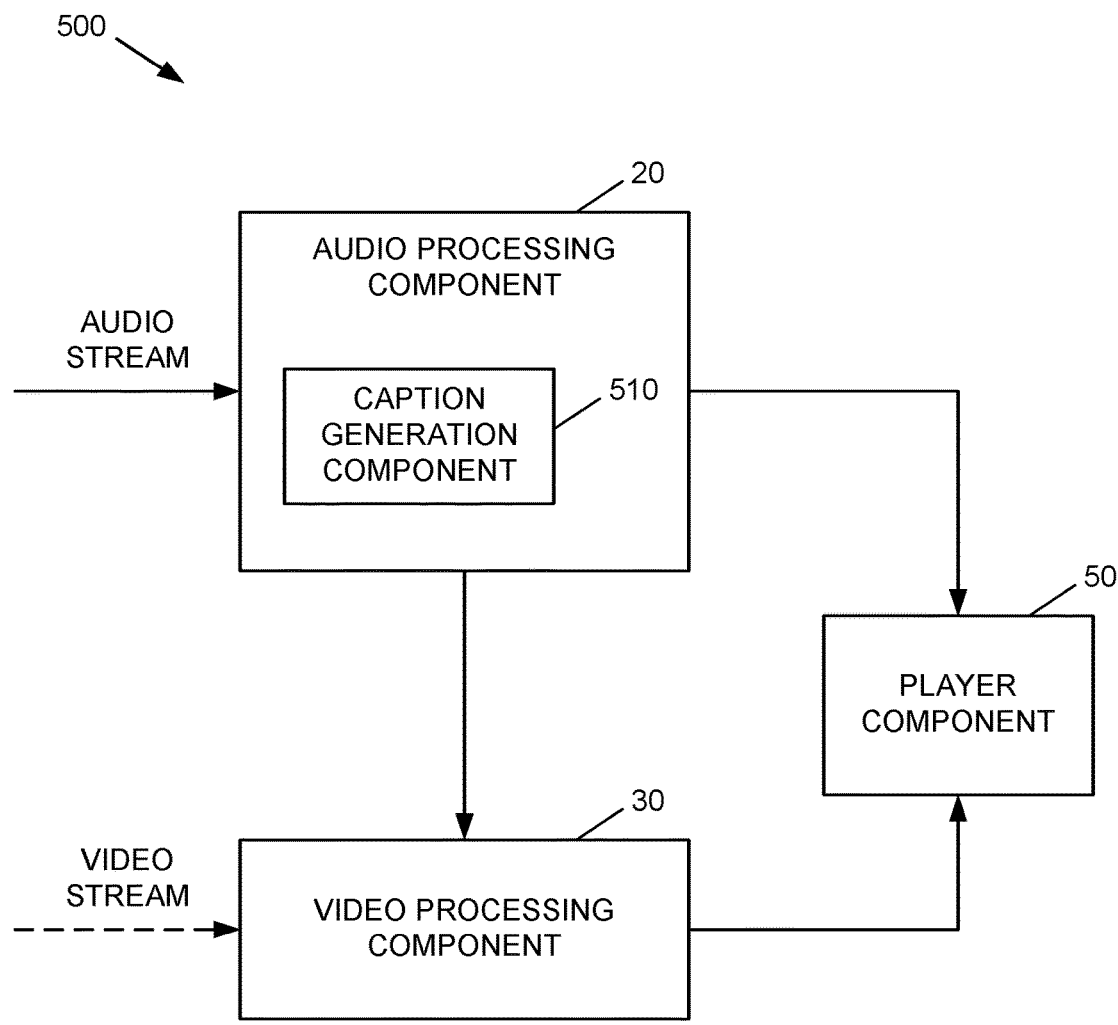

With reference next to FIG. 5, a system 400 is illustrated that includes a video processing component 30 as well as an audio processing component 20 having a caption generation component 510. Here, the audio processing component 20 receives an incoming audio stream, identifies spoken words or phrases in the audio stream, transcribes the words or phrases using visual captions, and provides the visual captions to the video processing component 30 and/or the player component 50 for display.

Caption generation as illustrated by system 500 can be performed with or without an accompanying video stream. If a video stream is present, the captions can be provided to the video processing component 30 to be combined with the accompanying video stream. Also or alternatively, generated captions can be separately provided to the player component 50 and displayed independently of any accompanying video.

In an example, the caption generation component 510 can operate in combination with the audio translation component 310 shown in system 300 to generate captions for an incoming audio stream in a language other than the original language of the audio stream. Generation of captions in a language other than the source language of the audio stream can be performed with or without translating the underlying audio. For instance, captions can first be generated in the source language and subsequently translated in text to a target language.

In addition to generating captions as shown by system 500, the audio processing component 20 and/or video processing component 30 can be configured to improve accessibility of media content in other ways. For instance, in addition to or in place of text captions, the audio processing component 20 can be configured to generate other visual representations of incoming audio, such as a sign language interpretation or the like. A sign language interpretation of audio content can be generated by the audio processing component 20 via computer graphics simulation and/or by constructing the interpretation using a database or other library of live sign language interpretations for the letters, words or phrases that make up the incoming audio. Other such methods, or a combination of such methods, could also be used. As with the text captions generated by the caption generation component 510, a sign language interpretation can be embedded into a corresponding video stream or provided as a standalone stream to the player component 50.

In another example, the video processing component 30, either independently or together with the audio processing component 20, can be configured to generate an audible description of a video stream to aid blind or otherwise visually impaired persons that may experience difficulty viewing the video stream. In a similar manner to the captions and/or sign language interpretations described above, the video processing component 30 can facilitate embedding of an audible video description with other audio data managed by the audio processing component 20 and/or provide the description to the player component 50 as a separate stream.

Supplemental media content generated by the audio processing component 20 and/or video processing component 30, such as the examples described above, can be processed using other processing techniques employed for the underlying media content and/or other techniques. For instance, captions and/or sign language interpretations of an audio stream can be generated in and/or otherwise converted to a color profile utilized by the video processing component 30 for a corresponding video stream and/or a different color profile. Similarly, audible descriptions generated for a video stream can be generated in and/or translated to a language utilized by the audio processing component 20 for a corresponding audio stream, and/or other adjustments can be applied to the descriptions.

In one aspect, features that improve accessibility of media content, such as those described above with respect to FIG. 5, can be managed via an application that is maintained separately from application(s) that control the audio processing component 20, the video processing component 30, and/or the player component 50. This application could be a standalone application resident on the client device 10 or incorporated within one or more other applications on the client device 10. As an example, a settings or "control panel" application on the client device 10 could include configuration options for accessibility features such as those described above. Subsequently, the application(s) on the client device that control accessibility features such as those described above can communicate with the application(s) that control the audio processing component 20, the video processing component 30, and/or the player component 50, and/or with those components 20, 30, 50 directly, to perform desired processing operations on incoming media content.

Figure 6:
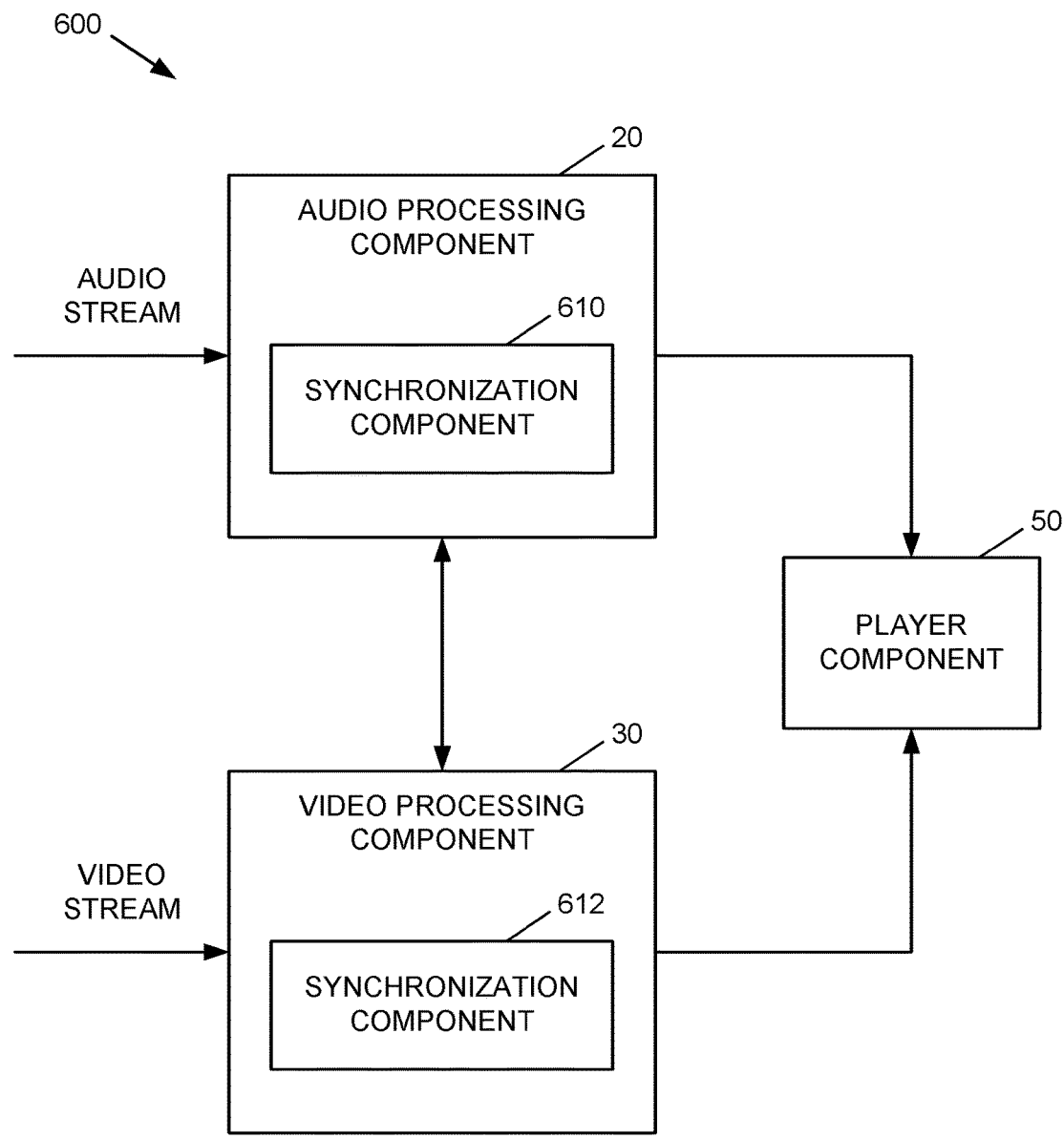
FIG. 6 is a functional block diagram of a system for synchronizing a media stream that can be implemented by the media client of FIG. 1.

Referring next to FIG. 6, a system 600 is illustrated that includes an audio processing component 20 and a video processing component 30 that each are associated with a respective synchronization component 610, 612. Here, the synchronization components 610, 612 can obtain timing reference information (e.g., keyframe indicators or the like) for incoming audio and video streams and utilize this information to synchronize those streams. This can be performed, e.g., by buffering and/or otherwise withholding media frames and/or other stream data for playing at a later time, by skipping or otherwise omitting media frames and/or other stream data, etc.

In an aspect, timing reference information for an incoming media stream can be obtained as part of the incoming media stream or independently of the media stream. For instance, in some cases timing reference information for an audio stream or a video stream can be provided without also providing the underlying stream itself. This could be done, e.g., to synchronize media playing via the player component 50 of the client device 10 with media and/or other events occurring separately from the client device 10 (e.g., a stage, a sports arena or stadium, a separate media player such as a television, etc.).

In another aspect, the synchronization components 610, 612 of the audio processing component 20 and the video processing component 30 can communicate with each other to account for processing delays and/or other factors that could affect the synchronization. For example, if the audio processing component 20 is configured to translate an audio stream from a source language to a target language, the synchronization component 212 of the video processing component 30 can cause the video processing component 30 to buffer and/or otherwise hold corresponding video stream data until the audio translation is complete.

Synchronization performed by the synchronization components 610, 612 can be performed automatically, or in some cases it can be at least partially directed by a user. For instance, a user, via the UI component 40, can be provided with an option to adjust an audio/video delay of incoming media streams if desired by the user to improve synchronization.

It is to be appreciated that the components and/or operations illustrated by FIGS. 3-6 are specific, non-limiting examples of techniques that can be employed by the media processing component 120 and that other techniques are also possible. For instance, the media processing component 120 can be configured to edit an audio stream and/or video stream for content, such that the media processing component 120 searches for potentially objectionable content (e.g., foul language, sexual content, violence, drug use, etc.) in incoming media stream(s) and edits the stream(s) to alter and/or remove such content. Such alteration may be performed by, for example, removing identified audio and/or video content, inserting a tone and/or other filler in place of identified audio content, applying a mosaic filter to and/or otherwise covering identified video content, etc.

Additionally, the audio processing component 20 and/or video processing component 30 can be configured to provide continuing support for additional processing features. For instance, various systems described above and/or their various components, such as the audio processing component 20, video processing component 30, UI component 40, and/or player component 50 can be associated with a software development kit (SDK), an application programming interface (API), and/or other means by which first- and/or third-party developers can build applications and/or other modules that provide additional functionality to one or more of the components 20, 30, 40, 50.

Access to the above-described content editing features, as well as any other processing operations either described herein or otherwise, can be restricted within the UI component 40. By way of example, a password or other credential can be required to change or remove content processing settings to prevent the settings from being altered by children or other unauthorized users.

In an aspect, the UI component 40 can store user profiles and/or similar data structures in order to apply a set of desired audio and/or video transformations to incoming media streams on a per-user basis. For example, if a profile for a user specifies a preferred language, the audio translation component 310 can be configured to translate incoming audio requested by the user to the preferred language. As another example, if a profile for a user indicates that the user is colorblind, the video adjustment component 410 can be configured to change the color profile of incoming video to enhance visibility of the video for the user. Similar to the examples described above, access to a user profile can be restricted via a password and/or other credential to prevent modification of a profile by other users. Irrespective of whether a user profile exists for a given media communication, a user of the client device 10 can utilize the UI component 40 to change processing settings on a per-stream basis, subject to authorization and/or other restrictions as described above.

Figure 7:
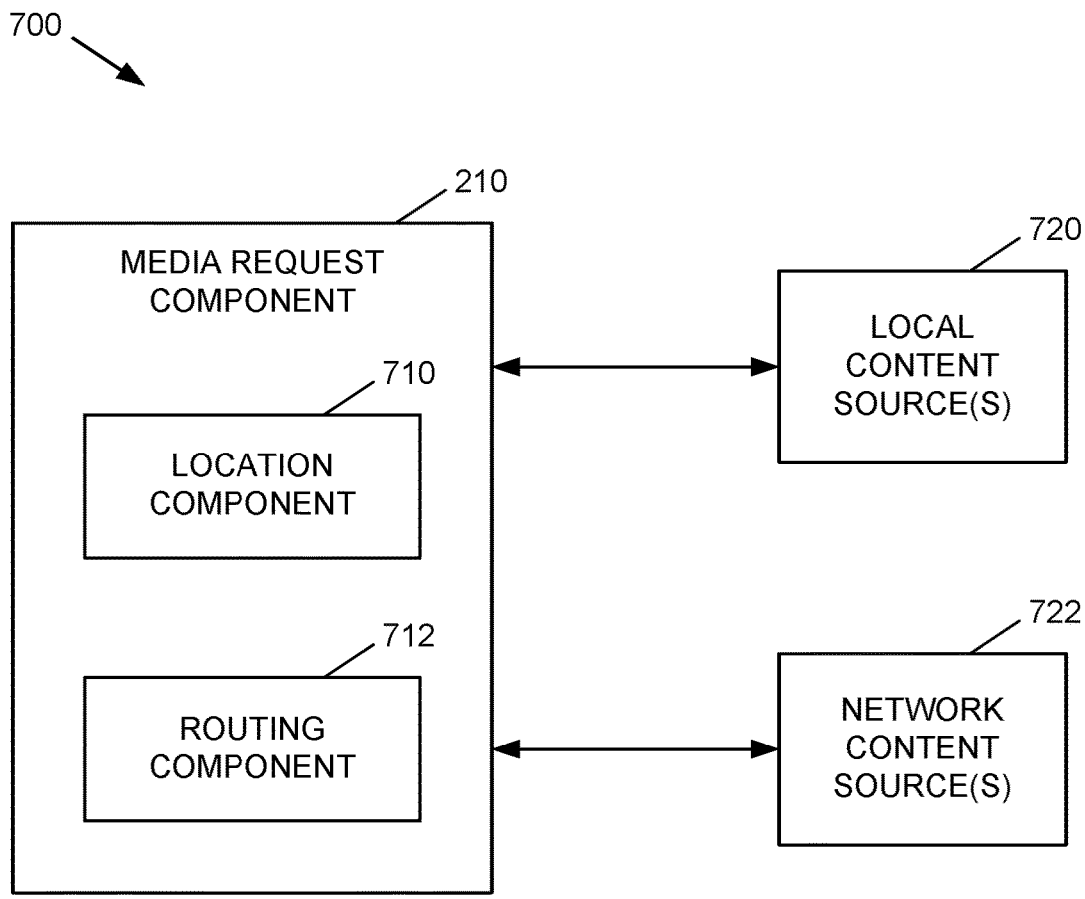
FIG. 7 is a block diagram of a system for forming and routing media stream requests.

Referring next to FIG. 7, a system 700 is illustrated that includes a media request component 210 having a location component 710 and a routing component 712. The location component 710 and routing component 712 are configured to manage requests for media communications associated with various content providers or sources, such as local content source(s) 720 and/or network content source(s) 722, as described herein.

In an aspect, the local content sources 720 include sources of media content that is associated with a geographical area. The associated media content can be media streams (audio streams, video streams, etc.) as generally discussed herein, or it could also or alternatively include live content (e.g., a play or opera, a concert, a sporting event, etc.). A local content source 720 that transmits one or more media streams can be a part of, or be associated with, a local network for a particular area, e.g., a local wireless network. As another example, such a content source can provide media streams through a network that is not location-specific (e.g., the Internet) and condition access to respective provided streams upon location restrictions. For instance, media streams corresponding to a live event such as a sporting event or concert could be restricted to the venue in which the event occurs.

In contrast to the local content sources 720, the network content sources 722 include sources of media content that are generally not associated with geographical restrictions. Media provided by the network content sources 722 could, however, be restricted in other ways. For instance, broadcasts such as sporting events could be subject to blackout restrictions and/or otherwise made unavailable in certain markets due to licensing restrictions or other factors. Additionally, content provided by a network content source 722 can be restricted by country and/or global region, e.g., due to intellectual property concerns. As a further example, content from a network content source 722 can be made available to a user subject to the terms of an agreement between the network content source 722 and the user (e.g., a pay-per-view agreement, a subscription agreement, etc.).

In an aspect, the location component 710 identifies a location associated with the media request component 210 (e.g., a location of a client device 10 associated with the media request component 210) and uses the identified location to identify one or more media sources 720, 722 that are available at that location. The location component 710 can utilize any suitable technique(s) for positioning, such as Global Positioning System (GPS) positioning, inertial positioning, network-based positioning, etc. Upon completion of the positioning, one or more media communications associated with the media sources identified via the location component 710 can be selected for playing. The selection may be done by a user based on a list of available communications presented to the user (e.g., via the UI component 40) and/or in other ways.

The routing component 712 can receive the stream selection and establish communication between the media request component 210 and the appropriate media source(s) 720, 722. If a media source requested by the media request component 210 is location-restricted, the routing component can include a location of the media request component 210 as determined by the location component 710 in a request to the corresponding media source. Alternatively, the applicable media source can include in its media communication(s) any applicable location restrictions, and based on this information the media request component 210 can be configured to permit or reject reception of the communication subject to those location restrictions without explicitly sending its location to the source.

Figure 8:
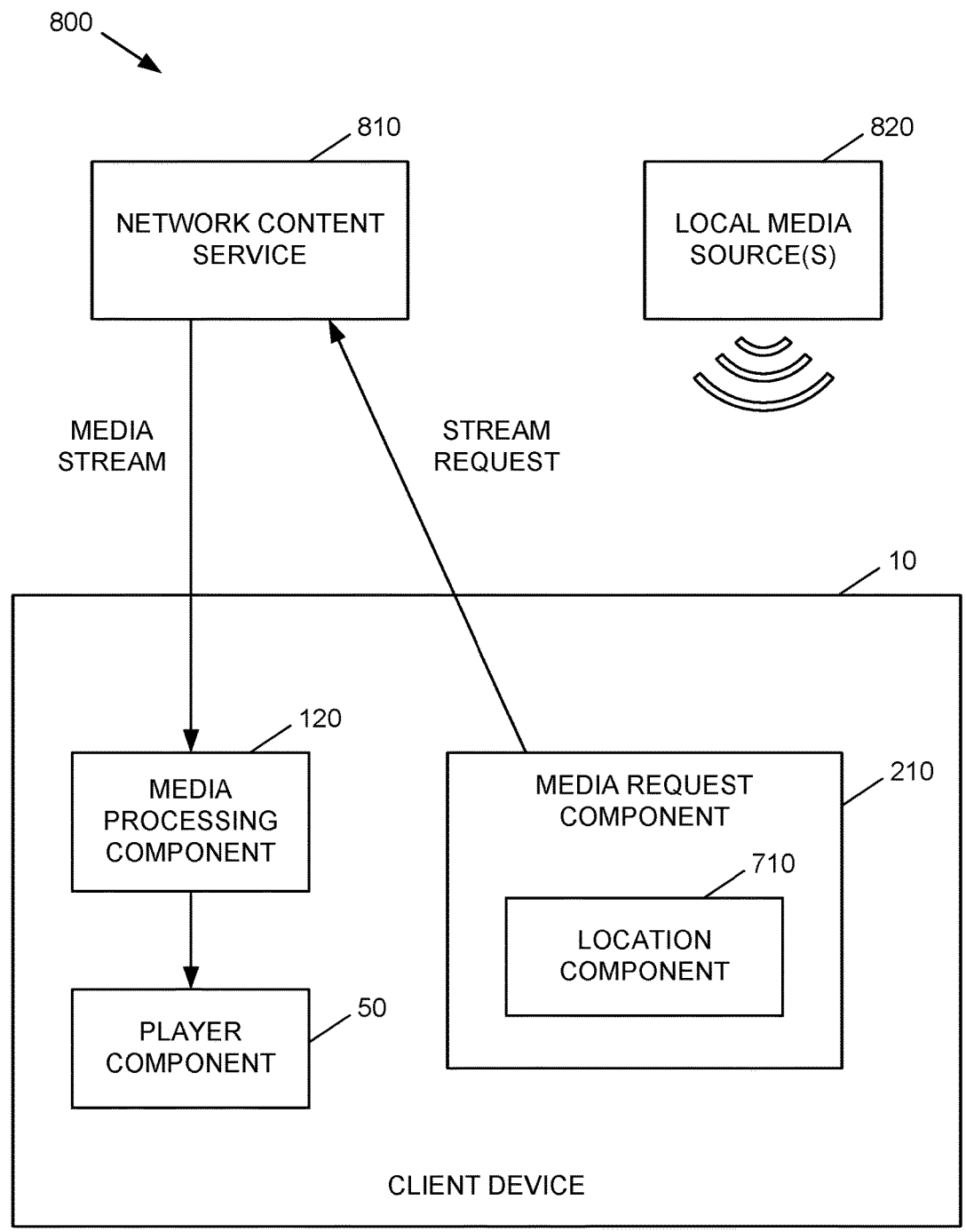
FIG. 8 is a block diagram of a system for requesting and processing location-restricted media communications.

Turning next to FIG. 8, a specific, non-limiting example of a location-dependent media communication is illustrated with respect to a system 800. The system 800 includes a client device 10 having a media processing component 120, a media request component 210, and a player component 50 as generally described herein. Here, the client device 10 is located in an area served by a network content service 810 and associated with at least one local media source 820. The local media source 820 can be a media source within the area that does not transmit media streams, e.g., a television or video screen, a live sporting event or concert, or the like. Additionally, the network content service 810 can provide one or more media streams to supplement the local media source 820. For instance, the network content service 810 can provide a video feed for a concert, an audio feed for a sporting event, etc.

The network content service 810 can condition access to the supplemental media stream(s) upon presence in the area associated with the local media source 820. By way of example, the network content service 810 could condition access to an audio feed for a sporting event to presence of the client device 10 in the stadium and/or other venue where the sporting event is occurring. In this manner, both the network content service 810 and the local media source 820 can operate as local content sources 720 as described above with respect to FIG. 7.

In an aspect, if the media request component 210 of the client device 10 identifies a requested media stream from the network content service 810 as corresponding to a location-restricted communication, the media request component 120 can be configured to provide the location of the client device 10 as determined by location component 710 in a request for that communication. Alternatively, as described above, the media stream as provided by the network content service 810 can contain information that restricts the media stream to a given location. In this case, the media request component 120 can condition access to the stream at the client device 10 based on the location of the client device 10 without sending this location to the network content service 810 or any other outside entities.

In addition to location-restricted communications, the client device 10 could also or alternatively obtain media streams corresponding to other, non-restricted communications from the network content service 810 and/or any other source(s). For instance, a user located at a sporting event could access location-restricted media associated with that sporting event as well as non-restricted media associated with a different sporting event at a different location. Other examples are also possible.

Figure 9:
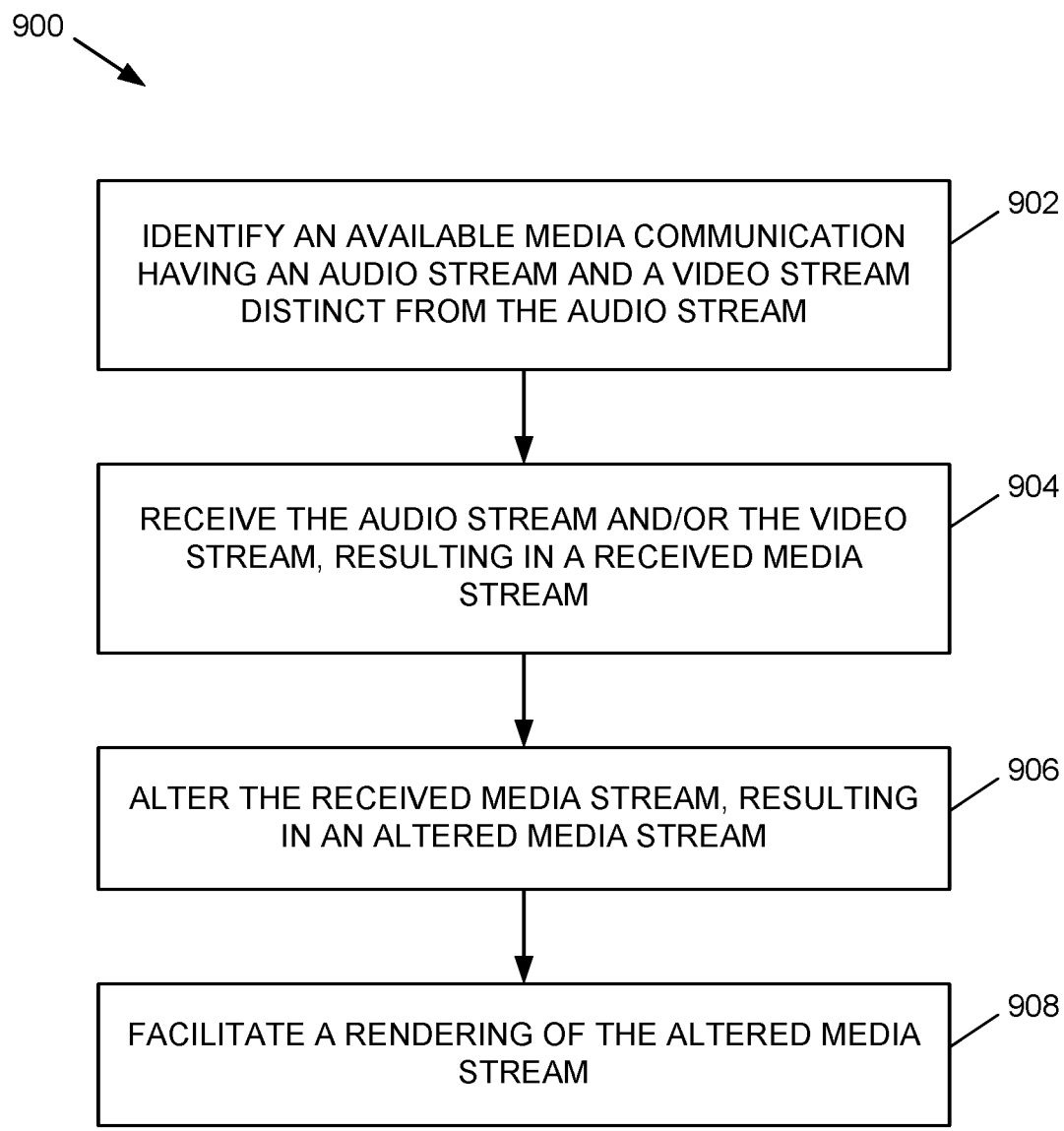
FIG. 9 is a flow diagram of a method for receiving and processing a media communication.

FIG. 9 illustrates a method in accordance with certain aspects of this disclosure. While, for purposes of simplicity of explanation, the methods are shown and described as a series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

With reference to FIG. 9, presented is a flow diagram of a process 900 for receiving and processing a media communication. At 902, an available media communication (e.g., from a content provider 110) having an audio stream and a video stream that is distinct from the audio stream is identified.

At 904, the audio stream and/or video stream is received (e.g., at a client device 10 by a media request component 120 and/or other means), resulting in a received media stream.

At 906, the received media stream obtained at 904 is altered, resulting in an altered media stream. If the received media stream includes an audio stream, the audio stream can be altered by, e.g., the audio processing component 20 and/or the media processing component 120 utilizing one or more of the operations described herein and/or other suitable operations. Similarly, if the received media stream includes a video stream, the video stream can be altered by, e.g., the video processing component 30 and/or the media processing component 120 utilizing one or more of the operations described herein and/or other suitable operations.

At 908, a rendering (e.g., for playing at the player component 50) of the altered media stream produced at 906 is facilitated, e.g., by the media processing component 120 and/or the player component 50. As described above, rendering and/or playing of the altered media stream can be performed on a same device as that which performs process 900 or a different device.

Figure 10:
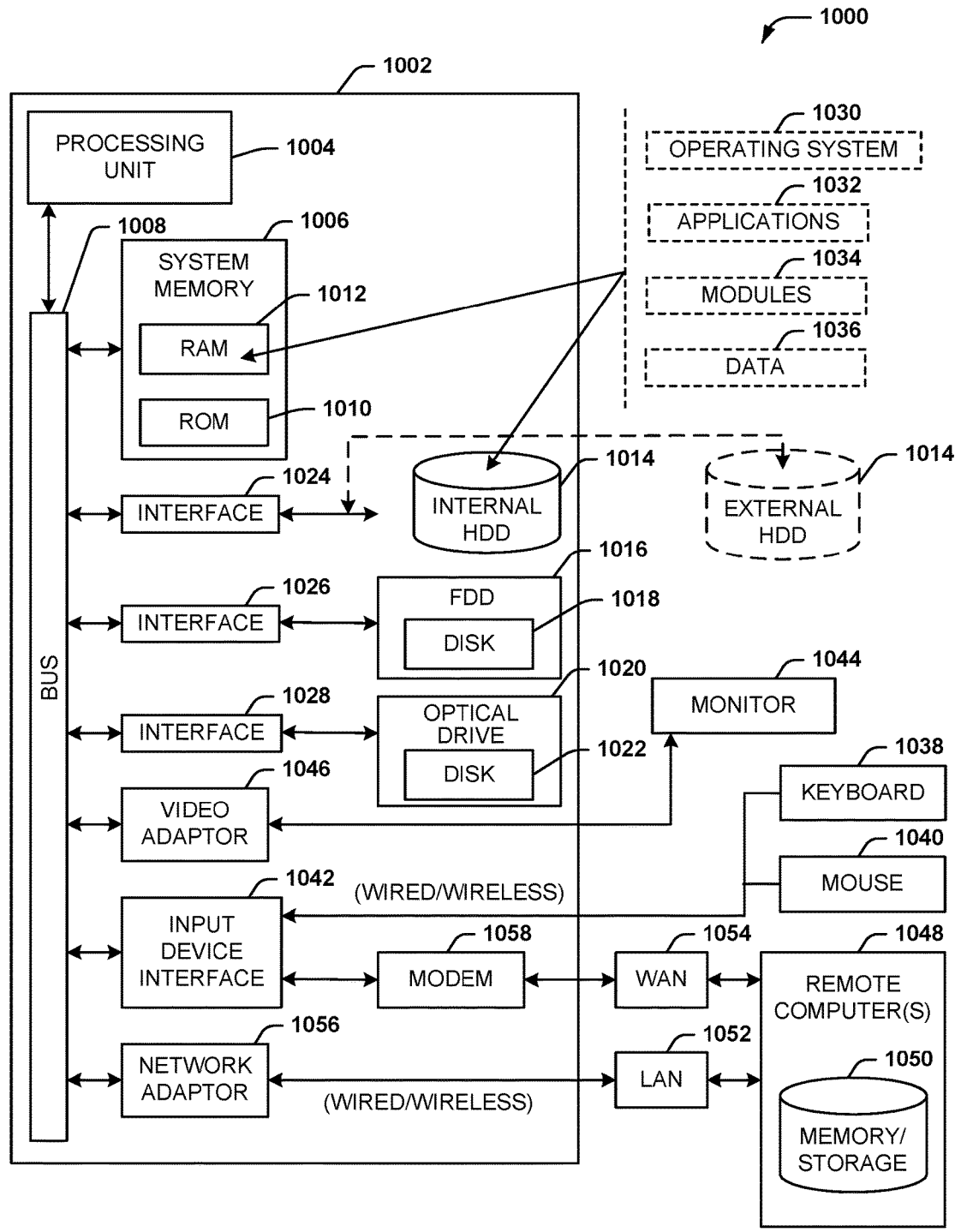
FIG. 10 is a diagram of an example computing environment in which various embodiments described herein can function.

Referring now to FIG. 10, there is illustrated a block diagram of a computing environment in accordance with various aspects described herein. For example, in some embodiments, the computer can be or be included within the content provider 110 and/or the client device 10.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). While the internal HDD 1014 is illustrated as located within the computer 1002, the internal HDD 1014 can also be configured for external use in a suitable chassis (not shown). The HDD 1014, magnetic FDD 1016 and optical disk drive 1020 can be connected to the system bus 1008 by an HDD interface 1024, a magnetic disk drive interface 1026 and an optical drive interface 1028, respectively. The interface 1024 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to an HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a USB port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless access point (AP) disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54

Mbps (802.11b) data rate, for example or with products that contain both bands (dual band), so the networks can provide real-world performance similar to the basic 10BaseT wired Ethernet networks used in many offices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   identifying, by a device comprising a processor, an available media communication, wherein the available media communication comprises an audio stream and a video stream that is distinct from the audio stream, wherein the audio stream comprises a first phrase spoken in a first language and at least a second phrase spoken in a second language that differs from the first language;
   receiving, by the device, the audio stream of the available media communication, resulting in a received media stream;
   receiving, by the device, the video stream of the available media communication;
   searching, by the device, the received media stream for an instance of target audio content, wherein the instance of the target audio content comprises the first phrase;
   altering, by the device, audio content of the received media stream at the instance of the target audio content in the received media stream by translating the first phrase from the first language to a third language that differs from the first language, resulting in an altered media stream;
   buffering, by the device, the video stream of the available media communication until completion of the translating; and
   facilitating, by the device, a rendering of the altered media stream.

2. The method of claim 1, wherein:
   the device is a first device,
   the identifying comprises obtaining a media provider identity associated with the available media communication,
   the method further comprises transmitting, by the first device, a media request to a second device associated with the media provider identity, and
   the receiving comprises receiving the audio stream in response to the media request.

3. The method of claim 2, wherein:
   the identifying further comprises identifying the available media communication as being a location-restricted communication, and
   the transmitting comprises transmitting, by the first device, an indication of a location of the first device to the second device associated with the media provider identity.

4. The method of claim 1, wherein:
   the receiving comprises receiving the audio stream via a first communication channel,
   the method further comprises receiving the video stream via a second communication channel that is different than the first communication channel, and the facilitating the rendering comprises:
  merging the audio stream and the video stream in response to the altering, resulting in a merged media stream, and
  facilitating the rendering of the merged media stream.

5. The method of claim 1, further comprising:
  receiving the video stream of the available media communication, wherein the video stream utilizes a first color profile, and
  altering a color profile of the video stream from the first color profile to a second color profile.

6. The method of claim 1, further comprising:
  receiving, by the device, timing reference information for the available media communication; and
  synchronizing the audio stream with the timing reference information.

7. The method of claim 1, wherein the facilitating the rendering comprises:
  transmitting the altered media stream to a media playback device; and
  enabling the rendering of the altered media stream by the media playback device.

8. The method of claim 1, further comprising:
  generating, by the device, replacement audio content for the instance of target audio content;
  wherein the altering comprises altering the content of the received media stream by inserting the replacement audio content into the received media stream at the instance of the target audio content in the received media stream.

9. The method of claim 1, wherein:
  the altering comprises generating, by the device, an audio translation of the first phrase from the first language to the third language.

10. The method of claim 9, wherein:
  the altering further comprises inserting the audio translation of the first phrase into the received media stream at the instance of target audio content.

11. The method of claim 1, wherein the third language is a same language as the second language.

12. The method of claim 1, wherein the identifying comprises identifying the first language as a source language for the first phrase from the audio stream.

13. The method of claim 12, wherein the identifying further comprises identifying spoken words in the audio stream, the spoken words being in respective ones of languages that include the first language, and identifying the first language from the languages.

14. A system, comprising:
  a processor; and
  a memory that stores executable instructions that, when executed by the processor, facilitate performance of operations, comprising:
    identifying an available media communication comprising an audio stream and a video stream that is distinct from the audio stream, wherein the audio stream comprises a first phrase spoken in a first language and at least a second phrase spoken in at least one second language that differs from the first language;
    receiving the audio stream of the available media communication, resulting in a received media stream;
    receiving the video stream of the available media communication;
    searching the received media stream for an instance of target audio content, wherein the instance of the target audio content comprises the first phrase;
    altering audio content of the received media stream at the instance of the target audio content in the received media stream by translating the first phrase from the first language to a third language that differs from the first language, resulting in an altered media stream;
    buffering the video stream of the available media communication until completion of the translating; and
    playing the altered media stream.

15. The system of claim 14, wherein the operations further comprise:
  obtaining a media provider identity associated with the available media communication;
  transmitting a media request to a device associated with the media provider identity; and
  receiving the audio stream in response to the media request.

16. The system of claim 15, wherein the operations further comprise:
  identifying the available media communication as being a location-restricted communication, and
  transmitting an indication of a location of the system to the device associated with the media provider identity.

17. The system of claim 14, wherein the operations further comprise:
  receiving the audio stream via a first communication channel;
  receiving the video stream via a second communication channel that is different than the first communication channel;
  merging the audio stream and the video stream, resulting in a merged media stream; and
  playing the merged media.

18. The system of claim 14, wherein the operations further comprise:
  receiving the video stream of the available media communication, wherein the video stream utilizes a first color profile; and
  altering a color profile of the video stream from the first color profile to a second color profile.

19. A non-transitory machine-readable storage medium, comprising executable instructions that, when executed by a processor, facilitate performance of operations, comprising:
  identifying an available media communication, wherein the available media communication comprises an audio stream and a video stream that is separate from the audio stream, wherein the audio stream comprises a first phrase spoken in a first language and at least a second phrase spoken in at least one second language that differs from the first language;
  receiving the audio stream of the available media communication, resulting in a received media stream;
  receiving the video stream of the available media communication;
  searching the received media stream for an instance of target audio content, wherein the instance of the target audio content comprises the first phrase;
  altering audio content of the received media stream at the instance of the target audio content in the received media stream by translating the first phrase from the first language to a third language that differs from the first language, resulting in an altered media stream;

buffering the video stream of the available media communication until completion of the translating; and facilitating playing of the altered media stream.

20. The non-transitory machine-readable storage medium of claim 19, wherein the operations further comprise:

receiving the audio stream via a first communication channel;

receiving the video stream via a second communication channel that is separate from the first communication channel;

merging the audio stream and the video stream, resulting in a merged media stream; and facilitating playing of the merged media stream.

* * * * *